US006876471B1

(12) United States Patent
Konno

(10) Patent No.: US 6,876,471 B1
(45) Date of Patent: Apr. 5, 2005

(54) IMAGE READING DEVICE

(75) Inventor: Masaaki Konno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 498 days.

(21) Appl. No.: 09/588,345

(22) Filed: Jun. 7, 2000

(30) Foreign Application Priority Data

Jun. 8, 1999 (JP) .......................................... 11-161127

(51) Int. Cl.[7] .................................................. H04N 1/46
(52) U.S. Cl. ........................ 358/500; 358/505; 358/509
(58) Field of Search ................................ 358/500, 475, 358/505, 453, 1.15, 451, 474, 497, 1.16, 448, 452, 509, 513, 514; 359/821, 207; 270/58.18, 290

(56) References Cited

U.S. PATENT DOCUMENTS 4,490,740 A * 12/1984 Moriguchi .................. 358/500
4,930,008 A * 5/1990 Suzuki et al. ............... 358/500

* cited by examiner

*Primary Examiner*—Edward Coles
*Assistant Examiner*—Heather D. Gibbs
(74) *Attorney, Agent, or Firm*—Sughrue Mion, PLLC

(57) ABSTRACT

An image reading device, in which two LED chip groups, light emission thereof being separately controlled, are disposed along a direction perpendicular to a conveyance direction of a photographic film. Acrylic blocks for guiding light to a vicinity of the photographic film, a lens unit for focusing light transmitted through the frame image, and a three-line CCD for receiving and conducting photoelectric conversion of the transmitted light are respectively disposed at positions corresponding to the LED chip groups. Hence, by simultaneously conveying photographic films, each having a width corresponding to the width of each LED chip group, and separately irradiating each of the photographic films from one LED chip group, frame images of each film can be read simultaneously.

29 Claims, 8 Drawing Sheets

30
76
80A
21
80
80A
80
66
64
64
66
W 10
14
16
16M
16K
18
20
PROCESSOR SECTION
62
60
58
52
R
G
B
54
LASER DRIVER
56
IMAGE MEMORY
IMAGE FILE
COLOR GRADATION PROCESSING
46
HYPER-TONE PROCESSING
48
HYPER-SHARPNESS PROCESSING
50
IMAGE MEMORY
44
FILE IMAGE DATA
A/D CONVERTER
32
30
76
74
21(22)
80
66
64
38
FLOPPY DRIVE
40
MO OR CD
42
MODEM
34
DIGITAL CAMERA
36
SCANNER 10
14
68
28
26
16M
16K
16

IMAGE READING DEVICE

BACKGROUND OF THE INVENTION

1. Field of the Invention

The present invention relates to an image reading device in which image data is obtained by reading light that is one of transmitted through and reflected from frame images while a plurality of originals on which frame images are recorded are conveyed.

2. Description of the Related Art

There has been known in recent years an image forming technique in which a frame image recorded on an original such as a photographic film is photoelectrically read by a reading sensor such as a CCD, digital image data obtained by reading is subjected to image processing, such as enlargement, reduction and various corrections, and thereafter an image is formed on a recording material by a laser beam modulated on the basis of the digital image data which has been subjected to image processing.

In such an image reading technique, in which a frame image is digitally read by an image sensor such as a CCD, the frame image is read in a two-stage reading process. That is, in order to achieve accurate image reading, reading conditions corresponding to density of the frame image (for example, amount of light to be irradiated onto the frame image, the charge accumulation time of the CCD, and the like) are determined by conducting a preliminary reading of the frame image (known as pre-scanning) and then re-reading the frame image under the reading conditions determined from the pre-scanning (known as fine scanning).

In the above image reading system a halogen lamp, which is conventionally used for printing exposure and the like, is used as a light source. The halogen lamp, however, generates a large amount of heat when emitting light, which results in low efficiency of light emission. Accordingly, improvement of image reading speed has been limited for the image reading systems in which a halogen lamp is used.

A halogen lamp is most suitably used as a light source for direct printing on photographic printing paper by transmitting light through a negative film, as in the case of printing exposure. However, when a halogen lamp is employed in an image reading system which uses a CCD (for example, a linear CCD in which filters are attached, each of which corresponds to one of three primary colors) as described above, amounts of light of shorter wavelengths (blue (B) in particular) are low because of a low color temperature, which results in a poor signal-to-noise ratio of the image. Accordingly, improvement of image reading speed has been limited for image reading systems in which a halogen lamp is used.

Therefore, it has been proposed that LEDs be employed as a light source in an image reading system in which a CCD is used. Because an LED usually emits a specific color (blue: B, green: G, or red: R), a white light source can be formed by collectively disposing LEDs which emit each of these colors. Further, LEDs are suitable for use as light sources of image reading systems using CCDs, because of small amounts of heat generation and high color temperatures of LEDs.

Also, respective color filters can be attached to each line of a linear CCD such that each line detects density (amounts of light) for one of the colors.

In print processing of the above-described prior art, image readings of negative films of 135- (240-) size and the like are conducted one film at a time. Accordingly, the processing speed of printing is highly dependent on the speed at which each film is scanned. Particularly for a print process with film processing in which high-speed processing is required, further improvement of processing speed has been desired. However, further improvement of processing speed is not easily achieved, because scanning is conducted twice in order to achieve accurate image reading, as mentioned above.

Further, when image reading a large-size original, such as a Brownie-size film, it is necessary to provide LEDs having dimensions and light emission amounts corresponding to the size of the film. If the same device is to be used for reading images of both large-size originals and 135- (240-) size films, light emission capacity must be set to correspond to the large-size original, which may result in a problem of waste light being emitted from the light source (wasteful consumption of electric power) when images of 135- (240-) size film are read.

SUMMARY OF THE INVENTION

Considering the aforementioned, a first object of the present invention is to provide an image reading device in which high-speed processing can be conducted by simultaneous reading of images on a plurality of originals, and a second object of the present invention is to provide an image reading device in which appropriate amounts of light, which correspond to a size of the original, from the light source can be obtained without wasting light, for image reading of originals of different sizes.

A first aspect of the present invention is an image reading device for reading an image while conveying an original on which the image is recorded, comprising: a plurality of light emitting element units, at each of which a plurality of light emitting elements are (densely) arrayed along a first direction which is a direction perpendicular to the original's conveyance direction, the plurality of light emitting element units being linearly disposed along the first direction, and light emission of the plurality of light emitting element units being respectively separately controlled; an optical member for irradiating light emitted from the plurality of light emitting element units across at least an substantially entire width of the original in the first direction; and photoelectric conversion elements which are disposed in correspondence with the plurality of light emitting element units, receive light that is one of transmitted through and reflected from the image, and conduct photoelectric conversion of the received light, wherein the image is read while at least one original is being conveyed, the original having a width dimension corresponding to a width dimension of one of the plurality of light emitting element units or a combined width dimension of at least two of the plurality of light emitting element units.

In the present invention, the plurality of light emitting element units, light emission (including amounts of light) of each of which is separately controlled, are disposed linearly along the transverse direction. Photoelectric conversion elements, which receive emitted light which is one of transmitted through and reflected from the image and conduct photoelectric conversion of the received light, are provided in correspondence with the plurality of light emitting element units. Hence, by simultaneously conveying a plurality of originals each having a width dimension corresponding to the width dimension of each light emitting element unit and irradiating the originals with light from the light emitting element units, light emission and amounts of light being separately controlled for each unit, images of each of the originals can be read simultaneously.

Further, in a case in which an original having a width dimension corresponding to the total width dimension of two or more light emitting element units combined is to be read, the optical member irradiates the light emitted from the plurality of light emitting element units onto the entire width of the original in the transverse direction. The light emitted from the plurality of light emitting element units is made to be a single light, having a width dimension which corresponds to the width dimension of the original, by the optical member. As a result, reading of each of the images of the original which has a width dimension corresponding to the total width dimension of two or more light emitting element units can be conducted as in the case described above.

Thus, high-speed processing can be carried out by simultaneously reading images of a plurality of originals. Further, by combining two or more light emitting element units, reading of images of originals of different sizes can also be conducted.

Moreover, since the light emission of each of the plurality of light emitting element unit light sources is separately controlled, each light emitting element unit can emit light such that light having a width dimension corresponding to the width dimension of the original can be emitted. As a result, by controlling light emission only of a specified light emitting element unit, in accordance with the size of the original, an appropriate amount of light can be obtained from the light source. Thus, waste light from the light sources can be reduced.

In a second aspect of the present invention, there is provided an image reading device according to the first aspect, wherein the optical member is formed by a plurality of light-guiding members which are provided at positions respectively corresponding to positions of the plurality of light emitting element units, and the optical member guides the emitted light to a vicinity of the original and causes the emitted light to be continuous across at least the substantially entire width of the original and to be free of boundary lines.

In the second aspect of the present invention, the optical member is a plurality of light-guiding members, each corresponding to one of the plurality of light emitting element units. With these, light-guiding members, the light emitted from the plurality of light emitting element units is guided to the vicinity of a surface of the original. Furthermore, the light emitted from the plurality of light emitting element units is made to be a single light which is continuous along the transverse direction and has no boundary lines by the optical member.

Because one light guiding member is provided for each light emitting element unit, an amount of light lost in guiding the light to the vicinity of the surface of the original can be reduced. Moreover, a configuration in which the optical member corresponds with the plurality of light emitting element units has a degree of flexibility. Particularly, configurations with a large number of light emitting element units and the like are suitable.

In a third aspect of the present invention, there is provided an image reading device according to the first or second aspect, wherein two light emitting element units are provided and the image is read by causing a first direction central portion of one of or both of the light emitting element units to correspond with a first direction central portion of a conveying path of the original, in accordance with a first direction dimension of the original, a number of originals and a magnification at which the original is to be read.

In the third aspect of the present invention, in a case, for example, in which a high magnification A4 size or 12×10 inch (254×305 mm) size print is made from an original of 135-size film, high resolution, definition and the like are required. Accordingly, it is necessary to ensure a wide light-receiving area (area to be used) of the photoelectric conversion elements. In this case, the transverse direction central portion of one of the two light emitting element units is matched to the central portion of the conveying width of the original, and magnification of a focusing system for focusing light transmitted through the film image at the photoelectric conversion elements is altered. Thus, the light-receiving area of the photoelectric converter is enlarged. In this manner, image reading suitable for a high magnification print can be conducted.

Furthermore, even in such a case, in which a high magnification print is made, because only one of the two light emitting element units is caused to emit light for reading the image, the light from the light source can be used efficiently.

In a fourth aspect of the present invention, there is provided an image reading device for reading an image while conveying an original on which the image is recorded, comprising: a plurality of light emitting element units, at each of which a plurality of light emitting elements are arrayed along a first direction which is a direction perpendicular to the original's conveyance direction, the plurality of light emitting element units being disposed along the first direction, and light emission of the plurality of light emitting element units being respectively separately controlled; an optical member for guiding light emitted from each of the plurality of light emitting element units such that the light is irradiated to the original; an original carrier for positioning the original at a predetermined position and conveying the original; and a light receiving section for receiving light that is one of transmitted through and reflected from the original; wherein, in accordance with the original which is set at the original carrier, relative positions, in the first direction, of the light receiving section, the original, the optical member and the plurality of light emitting element units can be altered and light emission of each of the plurality of light emitting element units is respectively separately controlled.

In a fifth aspect of the present invention, there is provided an image reading device according to the fourth aspect, wherein the optical member and the plurality of light emitting element units are movable in the first direction, a position of the original at the original carrier, a position of the optical member, and positions of the plurality of light emitting elements are determined in accordance with at least one of a first direction dimension of the original, a number of originals set at a time at said original carrier, and a magnification at which reading is to be conducted.

In a sixth aspect of the present invention, there is provided an image reading device according to the fourth aspect, wherein the optical member is formed by a plurality of light-guiding members which are provided in respective correspondence with the plurality of light emitting element units.

In a seventh aspect of the present invention, there is provided an image reading device according to the sixth aspect, wherein each of the plurality of light-guiding members includes a light input section at which light emitted from one of the plurality of light emitting element units enters and a light output section from which the light exits, and end portions in the first direction of the output sections of adjacent light-guiding members contact one another without any gap.

A eighth aspect of the present invention is an image reading device for reading an image while conveying an original on which the image is recorded, comprising: a plurality of light emitting element units, at each of which a plurality of light emitting elements are arrayed along a first direction which is a direction perpendicular to the original's conveyance direction, the plurality of light emitting element units being linearly disposed along the first direction, and light emission of the plurality of light emitting element units being respectively selectively controlled in accordance with at least one of a first direction dimension of the conveyed original and a number of conveyed original; an optical member for irradiating light emitted from the plurality of light emitting element units across at least an substantially entire width of the original in the first direction; and photoelectric conversion elements which are disposed in correspondence with the plurality of light emitting element units, receive light that is one of transmitted through and reflected from the image, and conduct photoelectric conversion of the received light.

In a ninth aspect of the present invention, there is provided an image reading device according to eighth aspect of the present invention, wherein light emission of the plurality of light emitting element units is respectively selectively controlled in accordance with the number of conveyed originals which are conveyed in parallel;

In a tenth aspect of the present invention, there is provided an image reading device according to eighth aspect of the present invention, wherein light emission of the plurality of light emitting element units is respectively selectively controlled in accordance with the first direction dimension of the conveyed original.

In a eleventh aspect of the present invention, there is provided an image reading device according to eighth aspect of the present invention, wherein light emission of the plurality of light emitting element units is respectively selectively controlled in accordance with the first direction dimension and the number of conveyed originals in parallel.

In the eighth aspect of the present invention, the plurality of light emitting element units, light emission (including amounts of light) of each of which is separately controlled, are disposed linearly along the transverse direction. The optical member irradiates light emitted from the plurality of light emitting element units across at least an substantially entire width of the original in the first direction. Photoelectric conversion elements, which receive emitted light which is one of transmitted through and reflected from the image and conduct photoelectric conversion of the received light, are provided in correspondence with the plurality of light emitting element units. The light emission of the plurality of light emitting element units is respectively selectively controlled in accordance with at least one of the first direction dimension of the conveyed original and the number of conveyed original. Accordingly, reading of images on one original, reading of each of images on respective originals in parallel, or reading of different size originals (small size or large size original) can be performed.

In the ninth aspect of the present invention, in a case in which a plurality of the originals are conveyed in parallel, light emission including amounts of light of the plurality of light emitting element units is respectively selectively controlled in accordance with the number of conveyed originals. Accordingly, images of each original can be read simultaneously. Therefore, high-speed processing can be conducted.

In the tenth aspect of the present invention, the light emission of the plurality of light emitting element units is respectively selectively controlled in accordance with a first direction dimension, namely, a width dimension (a size) of the original. Therefore, the image reading device according to tenth aspect of the present invention can read different size originals. Foe example, when a small size original is read, a number of the light emitting element units which are to be emitted can be reduced correspondingly to the small size, or when a large size original is read, a number of the light emitting element units which are to be emitted can be increased correspondingly to the large size. Namely, the light amounts of the whole light source can be controlled in accordance with the size of the original to be read. Accordingly, when the images are read, appropriate amounts of light which correspond to the size of the original can be obtained without wasting light from light source.

In the eleventh aspect of the present invention, the light emission of the plurality of light emitting element units is respectively selectively controlled in accordance with the first direction dimension of the conveyed originals and the number of conveyed originals, the originals being conveyed in parallel. Each original has a width dimension corresponding to a total width dimension of one or more light emitting element units. Accordingly, each of the images on the respective originals can be read in parallel (simultaneously). Any number of originals can be read at a single time.

DESCRIPTION OF THE PREFERRED EMBODIMENTS

Figure 1:
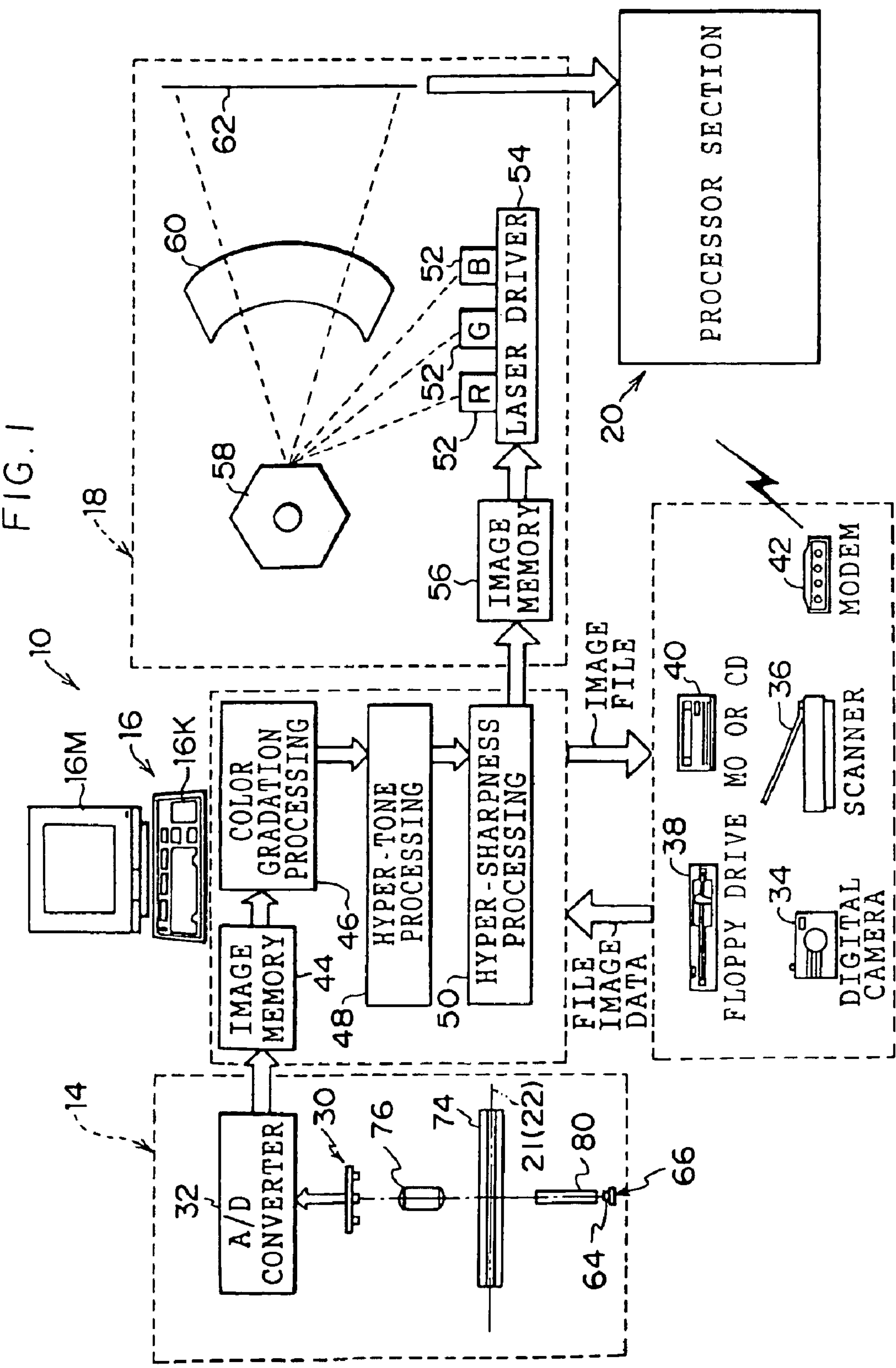
FIG. 1 is a schematic structural view of a digital laboratory system according to an embodiment of the present invention.
Figure 2:
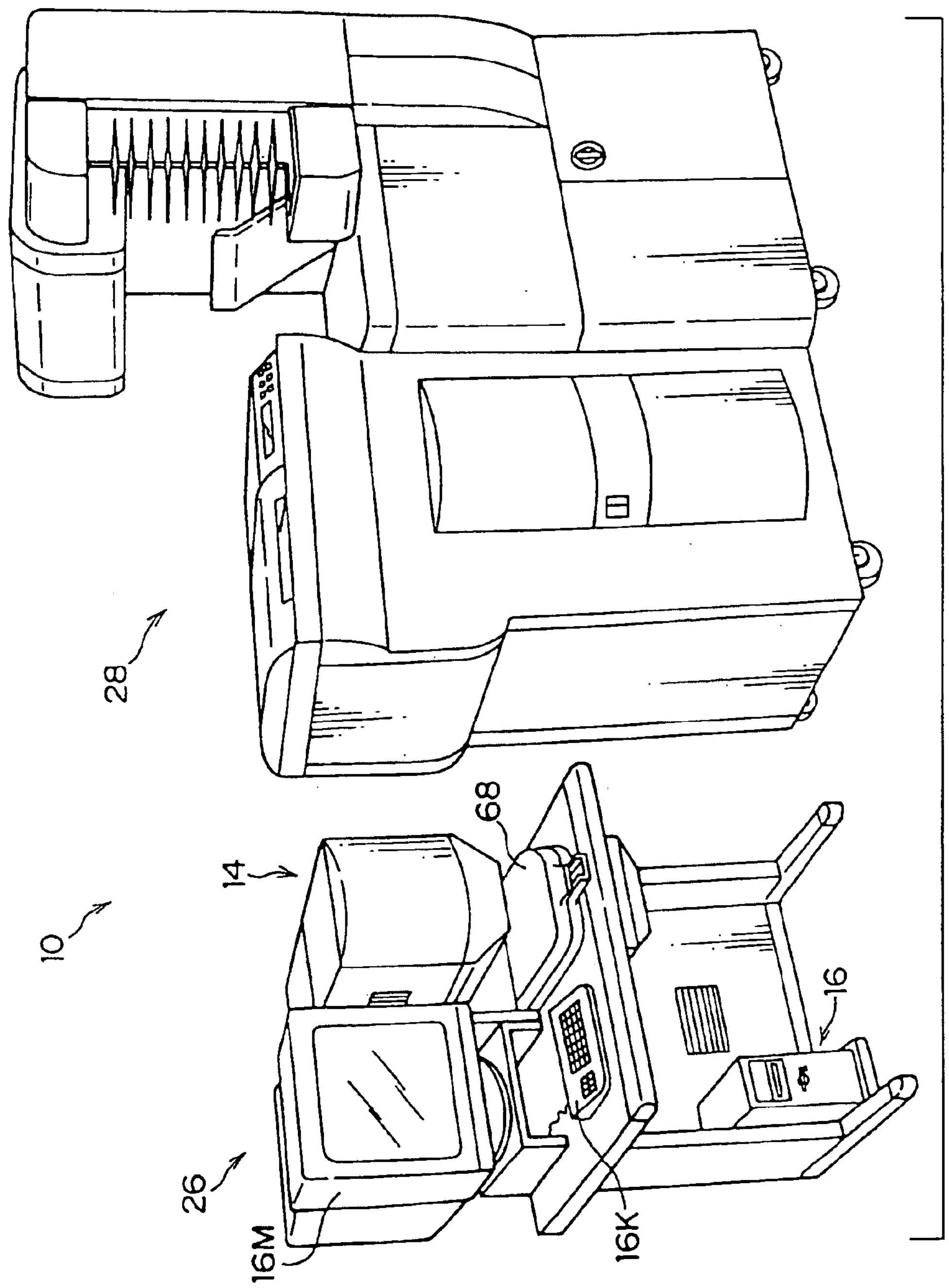
FIG. 2 is an outside view of the digital laboratory system.

FIGS. 1 and 2 show schematic structure and outside view of a digital laboratory system 10 according to the embodiment of the present invention.

As shown in FIG. 1, the digital laboratory system 10 is formed by a linear CCD scanner 14, an image processing section 16, a laser printer section 18, and a processor section 20. The linear CCD scanner 14 and the image processing section 16 are integrated to form an input section 26, shown in FIG. 2, and the laser printer section 18 and the processor section 20 are integrated to form an output section 28, also shown in FIG. 2.

The linear CCD scanner 14 is used to read frame images recorded on photographic film such as negative film, reversal film and the like. Examples of photographic films from which frame images can be read include 135-size photographic film, 110-size photographic film, photographic film with a transparent magnetic layer formed thereon (i.e., 240-size photographic film: known as APS film), and 120-size and 220-size (Brownie size) photographic films. The linear CCD scanner 14 reads the frame image to be read at a three-line CCD 30 and, after carrying out A/D conversion at an A/D converter 32, outputs image data to the image processing section 16.

The image processing section 16 is configured not only to allow input of the image data outputted from the linear CCD scanner 14 (i.e., scanned image data), but also to allow input from outside of image data obtained by photography using a digital camera 34 and the like, image data obtained by reading an original (for example, a reflective original and the like) with a scanner 36 (flat-bed type), image data generated by another computer and stored at a floppy disk drive 38, or an MO drive or CD drive 40, communication image data received via a modem 42, and the like.

The image processing section 16 stores the inputted image data at an image memory 44, performs image processing including various kinds of correction and the like at a color gradation processing section 46, a hypertone processing section 48, a hypersharpness processing section 50, etc., and outputs processed image data, as recording image data, to the laser printer section 18. The image processing section 16 can also output the processed image data, as an image file, to the outside (for example, the image data can be outputted to a storage medium such as an FD, MO, CD and the like, or transmitted to other information processing equipment via a communication line).

The laser printer section 18 includes red, green and blue laser light sources 52. A laser driver 54 is controlled such that laser light is modulated according to the recording image data inputted from the image processing section 16 (which data is temporarily stored at an image memory 56). The laser light is irradiated onto photographic printing paper 62 so as to record an image thereon by scan exposure processing (in the present embodiment, with an optical system in which a polygon mirror 58 and an f θ lens 60 are principally used). The processor section 20 carries out various processes, such as color development, bleach-fixing, washing and drying, on the photographic printing paper 62 on which the image has been recorded by scan exposure processing at the laser printer section 18. As a result, an image is formed on the photographic printing paper 62.

Structure of the Linear CCD Scanner

Next, a description will be given of the structure of the linear CCD scanner 14. FIGS. 3 through 8 show schematic structure and outside view of an optical system of the linear CCD scanner 14. This optical system includes light sources 66 in each of which an LED chip group 64 (a light emitting diode unit), formed by an assembled plurality of LED chips, is used and which irradiate a photographic film (for example, a Brownie-size photographic film 21 as in FIGS. 3 and 4). A description with reference to FIGS. 3 and 4 will be given below.

The LED chip group 64 is a plurality of LED chips disposed in a row (or possibly in two or more rows) in a photographic film 21 transverse direction (a direction perpendicular to the photographic film's conveyance direction). Two LED chip groups 64 are linearly disposed along the photographic film 21 transverse direction. Light emission and amounts of light are separately controlled for each LED chip group 64.

An acrylic block 80 is disposed at a light emitting surface side of each LED chip group 64. Each acrylic block 80 guides the light emitted by the respective LED to a vicinity of the photographic film 21. Each acrylic block 80 has a substantially trapezoid column shape, whose cross-sectional area becomes larger toward the direction of transmittance of the light. These two acrylic blocks 80 are disposed such that one of film transverse direction end portions of an emission surface 80A of one acrylic block 80 abuts one of film transverse direction end portions of an emission surface 80A of another acrylic block 80 which is adjacent to the one acrylic block 80 (i.e., the end portions which are adjacent to each other abut one another without any gap). As a result, the two emission surfaces 80A have the form of a single surface. The total width of these two acrylic blocks 80 (the width in the direction indicated by arrow W in the drawings) is set to be substantially the same as the width of the photographic film 21 (Brownie size).

Therefore, when the two LED chip groups 64 emit light at the same time, light is emitted from the LED chip groups 64, transmitted through the acrylic blocks 80 and outputted from the emission surfaces 80A. The total width of this light outputted from the emission surfaces 80A corresponds to the width of the photographic film 21. This light irradiates the entire transverse direction of the photographic film 21 as a continuous single light (a light with no contact boundary line).

A negative carrier 74 positions and conveys the photographic film. Further, a spherical surface (or aspherical surface) lens unit 76 and a three-line CCD 30 are disposed along an optical axis of the LED chip group 64, at a side of the photographic film which is opposite to the side at which the light sources 66 are disposed. The three-line CCD 30 is disposed further from the photographic film than the lens unit 76. The lens unit 76 focuses light which is transmitted through the photographic film.

The lens unit 76 is a focusing lens system with variable conjugate length and alterable magnification, formed by a plurality of lenses. Principal settings of the lens unit 76 as a focusing system (for example, magnification and F number) can be altered in accordance with required image reading conditions. Further, the lens unit 76 focuses light emitted from the LED chip groups 64 at a predetermined position, at which the three-line CCD 30 is disposed.

In the current case, in which the photographic film 21 (Brownie-size) is read, the lens unit 76 is set to be a focusing system of low magnification and small F number.

The configuration of the three-line CCD 30 is as follows. A plurality of pixels for detecting light are lined up along the photographic film 21 transverse direction, and three such lines are provided along the film's conveyance direction. Filters (not shown) of each of the three primary colors (R, G and B) are respectively attached to the lines of pixels, thereby enabling the three-line CCD 30 to separately receive light of each of R, G and B.

Thus, the light which transmits through the photographic film 21 is focused over almost the whole width of the three-line CCD 30 by the lens unit 76. Electric charges are accumulated in accordance with the light which is received at pixels from one end portion to another end portion of each line (one-dimensional data). As the photographic film 21 is conveyed, the frame image (two-dimensional data) is electrically read for each of R, G and B.

Figure 5:
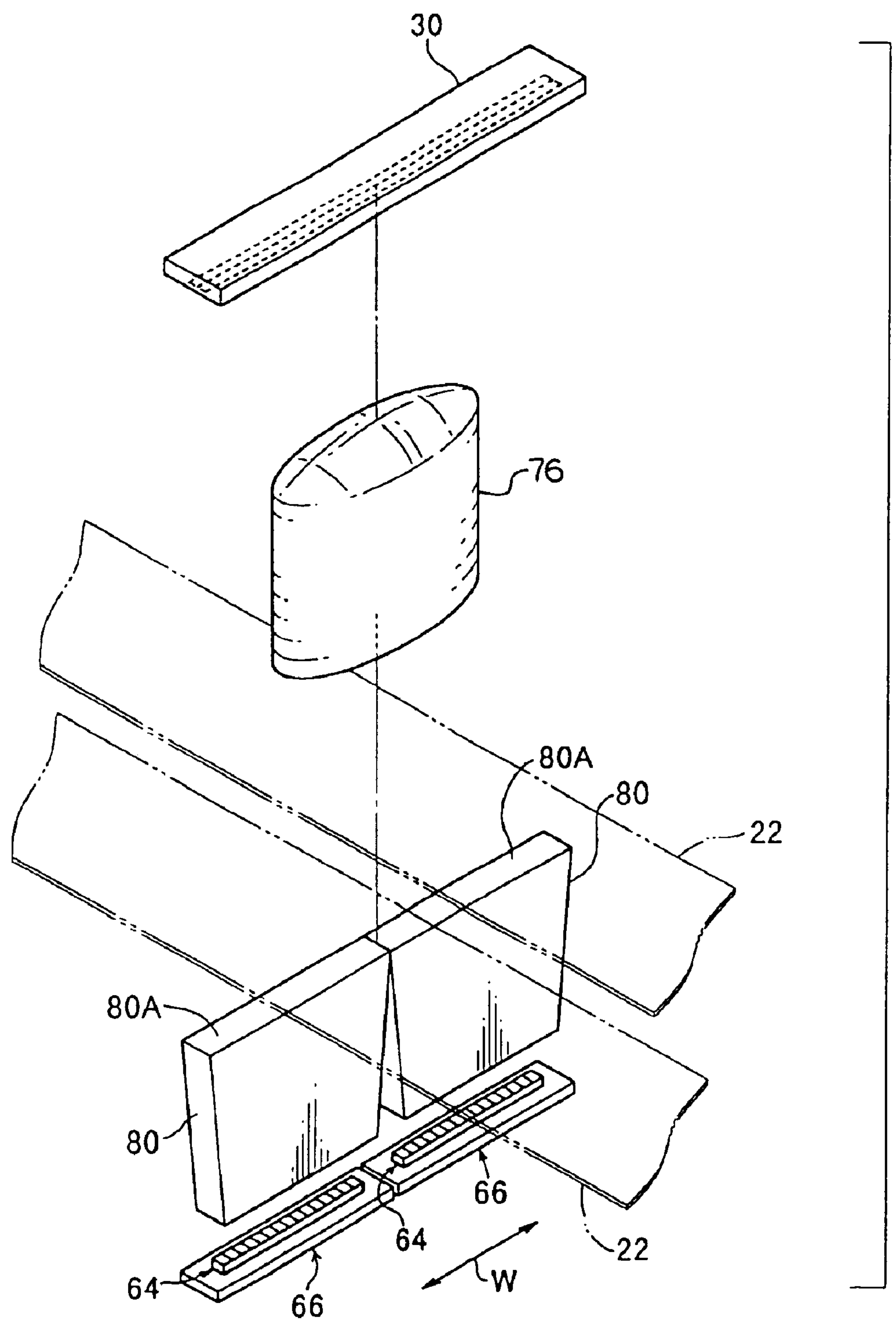
FIG. 5 is a perspective view schematically showing a structure of the optical system of the linear CCD scanner, shown in a condition in which two images of 135-size films are being simultaneously read.
Figure 6:
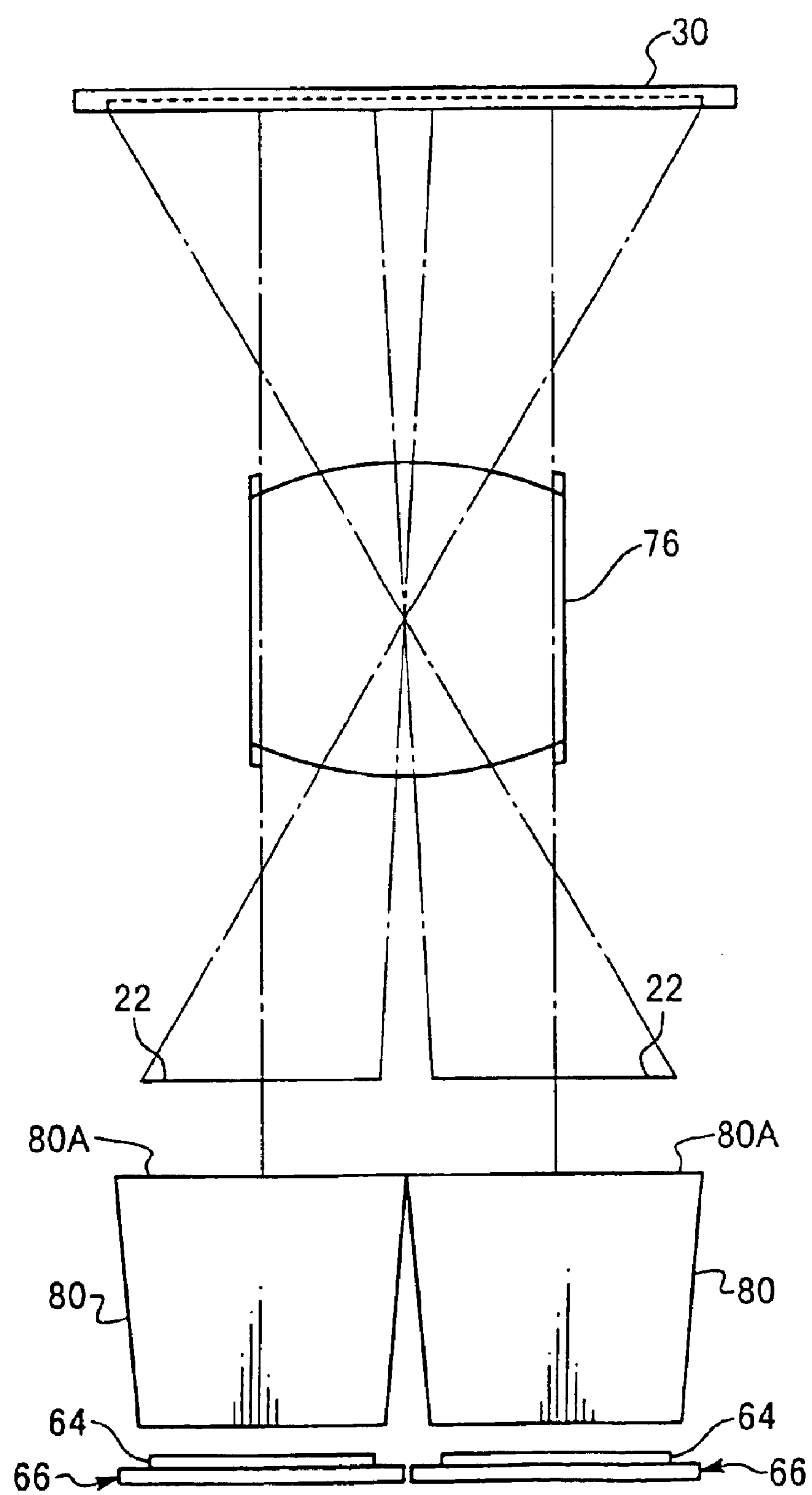
FIG. 6 is a plan view which shows the optical system of the linear CCD scanner shown in FIG. 5.

In a case in which an image on a 135- (or 240-) size photographic film 22 is read by the linear CCD scanner 14 of the present embodiment, as shown in FIGS. 5 and 6, two photographic films 22 can be conveyed at the same time after setting the films 22 at irradiation positions of respective LED chip groups 64. In this case, the lens unit 76 is set to be a focusing system of low magnification and small F number.

Emitting light and an amount of light emitted by each of the LED chip groups 64 is separately controlled. Frame images of the two photographic films 22 are focused at different light-receiving regions of the three-line CCD 30 (in the present embodiment, at a right portion and a left portion which have a predetermined space therebetween, as shown in FIG. 6). That is, each of two photographic films 22 are pre-scanned while the two photographic films 22 being simultaneously conveyed. During pre-scanning, the LED chip groups 64 emit separately controlled amounts of light in order to determine reading conditions for each frame image for fine scanning.

Therefore, it is not necessary to carry out complicated operations and settings to separately control the light-receiving regions of the three-line CCD 30. As a result, images can be simultaneously read at the image-receiving areas, under respective appropriate conditions.

Figure 7:
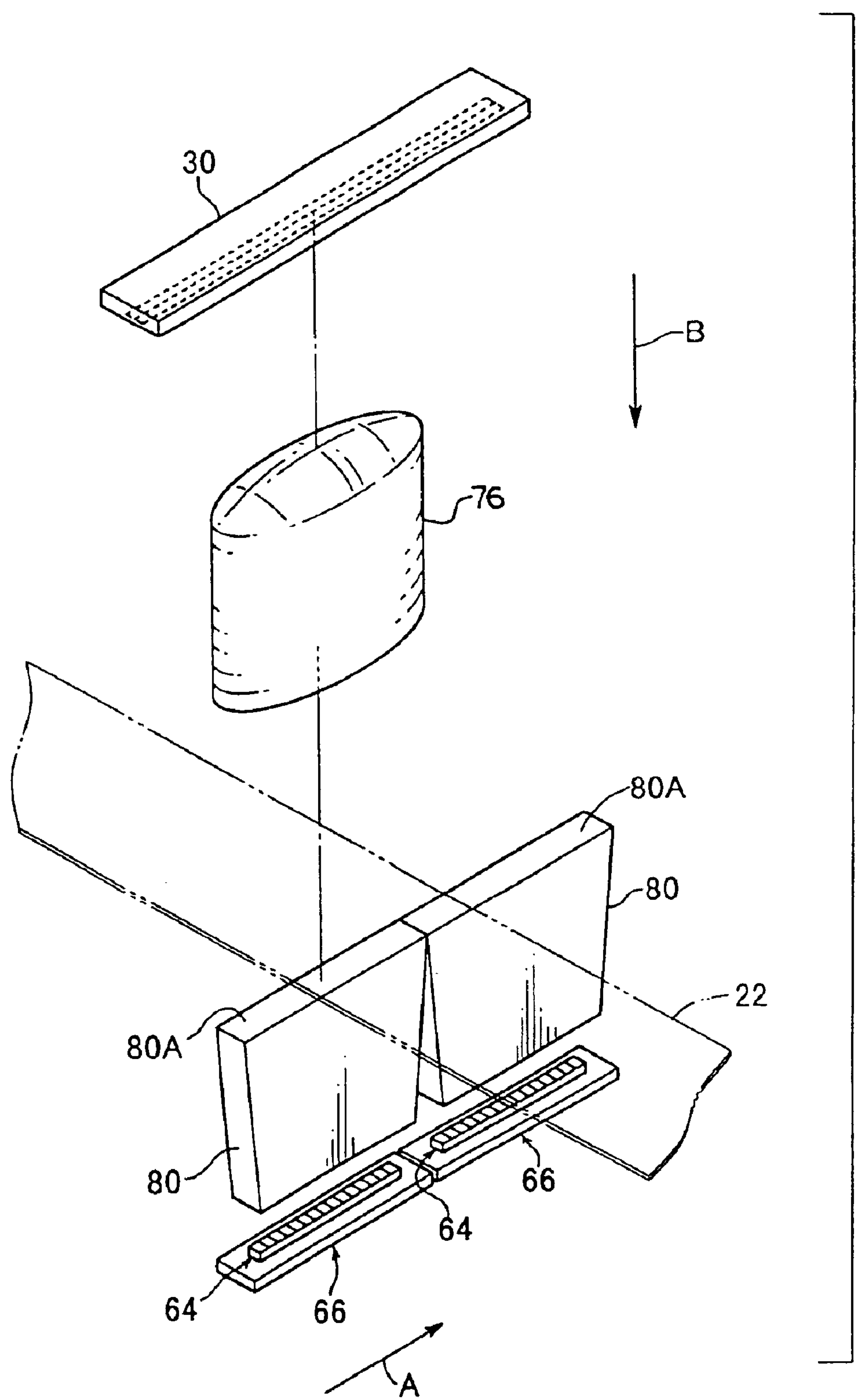
FIG. 7 is a perspective view schematically showing a structure of the optical system of the linear CCD scanner, shown in a condition in which an image of a 135-size film is being read at a high magnification.
Figure 8:
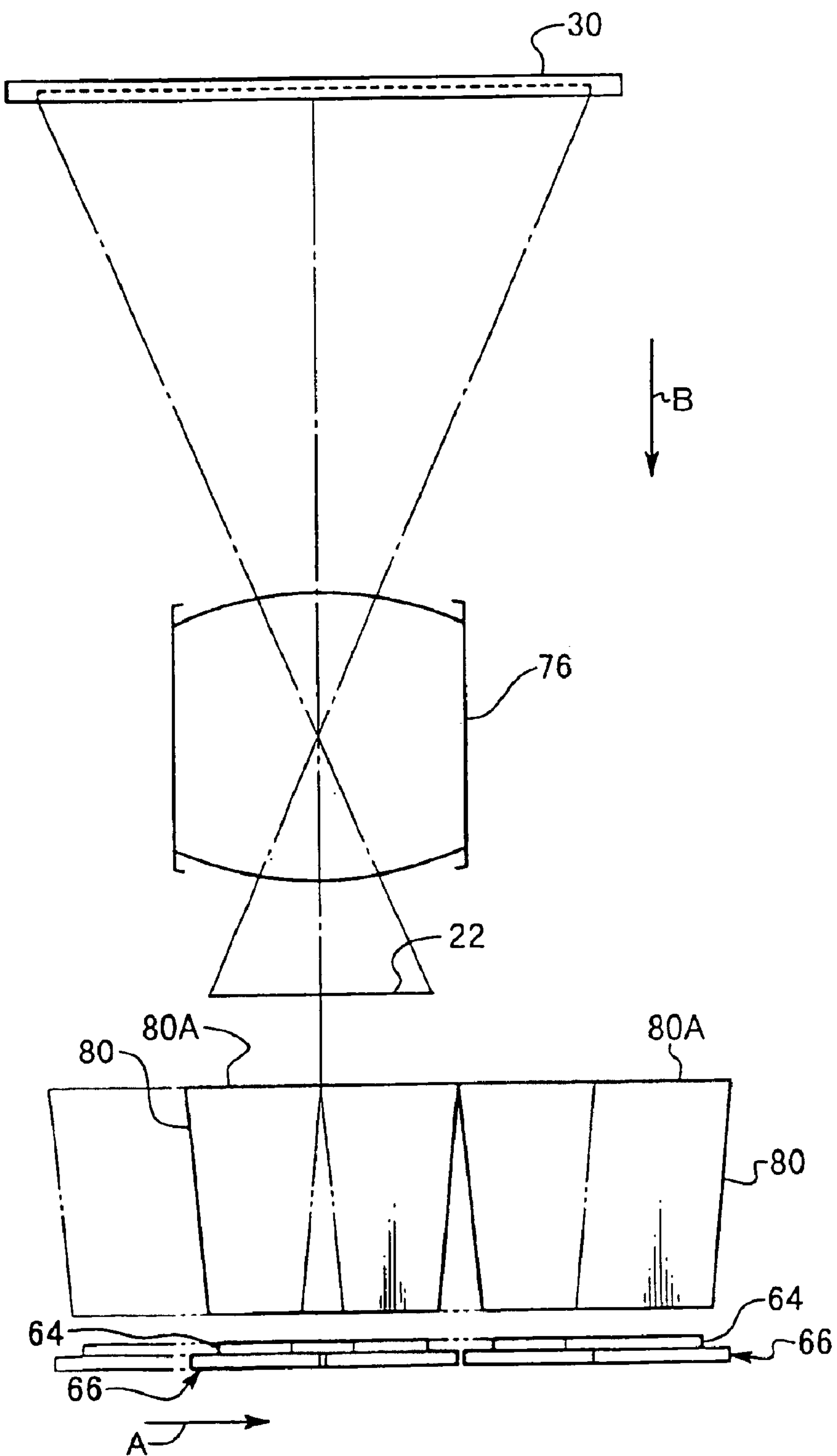
FIG. 8 is a plan view which shows the optical system of the linear CCD scanner shown in FIG. 7.

Reading may also be performed for a high magnification print such as a 12×10 inch size print. In such a case, as shown in FIGS. 7 and 8, one photographic film 22 is set at a transverse central portion of the film carrier 74 conveyance path, the LED chip group 64 and acrylic block 80 are moved (if necessary, two LED chip groups 64 and two acrylic blocks 80 are moved) in the transverse direction (indicated by arrow A in the drawings) such that one LED chip group 64 and acrylic block 80 correspond with the transverse central portion of: the film carrier 74 conveyance path and, at the same time, the lens unit 76 moves toward the photographic film 22 (in the direction indicated by arrow B in the drawings). In this case, the lens unit 76 is set to be a focusing system of high magnification and large F number.

Hence, the light-receiving range (light-receiving width) at the linear CCD 30, which receives light transmitted through a frame image, is enlarged to be wider than the width of the photographic film 22. (In the present embodiment, the light-receiving range (light-receiving width) is more than twice as wide as the film.) Thus, an amount of image data (resolution and definition) sufficient for a high magnification print can be obtained.

Operation of the present embodiment will be explained hereafter.

Image Reading of a Brownie-Size Film

Figure 3:
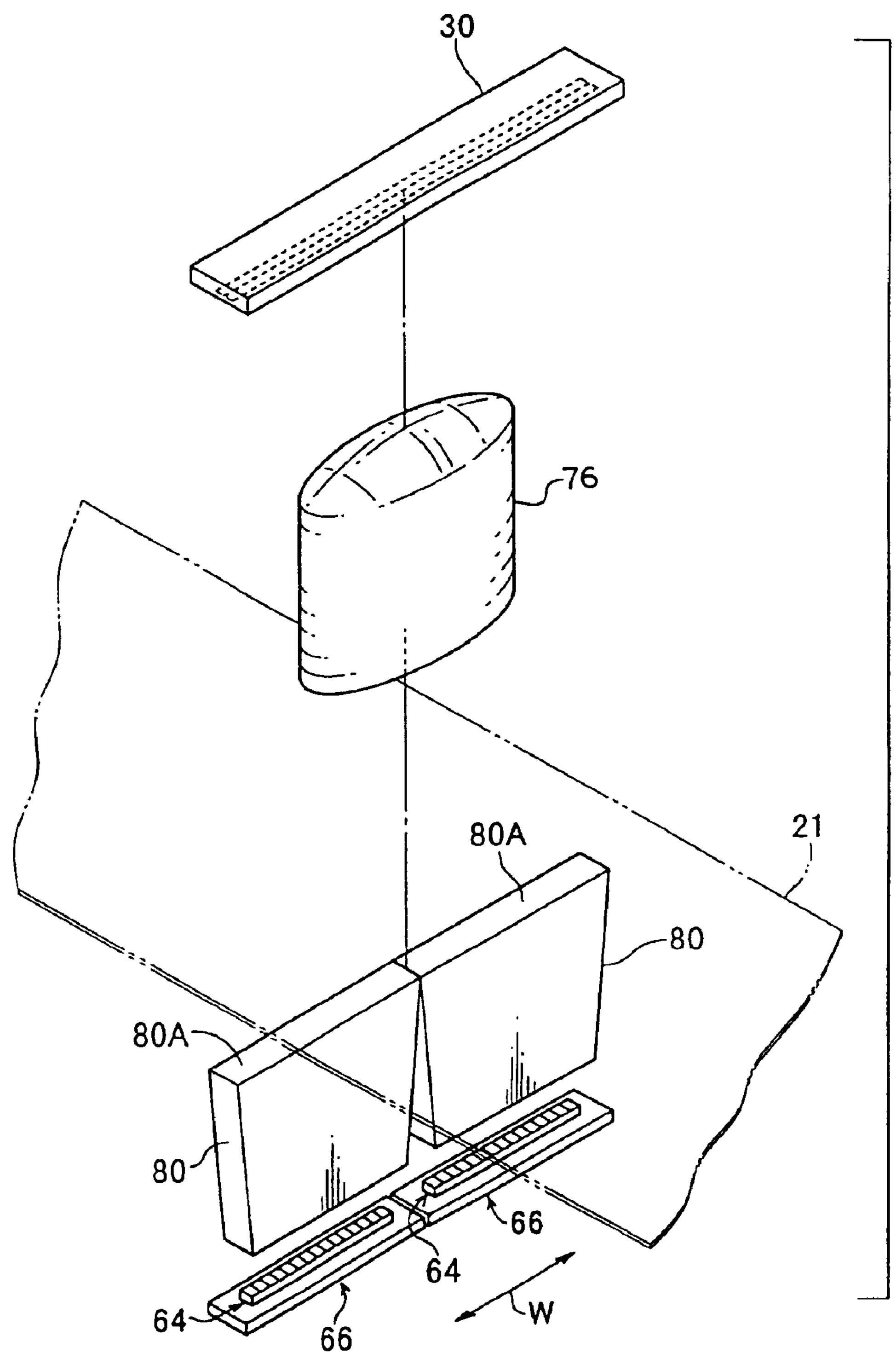
FIG. 3 is a perspective view schematically showing a structure of an optical system of a linear CCD scanner, shown in a condition in which an image of a Brownie-size film is being read.

An operator inserts the photographic film 21 in the film carrier 74, as shown in FIG. 3, and selects a mode for reading frame images of a Brownie-size film at a keyboard 16K of the image processing section 16. The two LED chip groups 64 and acrylic blocks 80 move so as to be centered on a position corresponding to the transverse central portion of the conveyance path. At the same time, the lens unit 76 moves toward a position at a predetermined distance from the photographic film 21 and is prepared as a focusing system of low magnification and small F number. (Hereinafter, such movements of the LED chip groups 64, the acrylic blocks 80 and the lens unit 76 are referred to as initialization mode.)

When commencement of reading is instructed, the film carrier 74 starts conveyance of the photographic film 21 and pre-scanning is performed. That is, while the photographic film 21 is conveyed at a relatively high speed, data of the image frame, and also various data outside an image recording area of the photographic film 21, are read by the linear CCD scanner 14. The read image is displayed at a monitor 16M.

Next, reading conditions for fine scanning are set for each frame image on the basis of results of the pre-scanning of each frame image.

When setting of the fine scanning reading conditions for all frame images is complete, the photographic film 21 is conveyed in a direction opposite to the direction of the pre-scanning and fine scanning of each frame image is performed.

At this time, the fine scanning is carried out in an order from a last frame to a first frame, because the photographic film 21 is being conveyed in the opposite direction to the direction of the pre-scanning. The fine scanning is conducted at a lower speed than the pre-scanning. Thus, reading resolution is high. Furthermore, at fine scanning, reading can be conducted under appropriate reading conditions, because the conditions of the image (aspect ratio of the photographed image, photographing conditions such as under-, normal-, over-, superover-exposure, and the like, whether a flash was used, etc.) have already been determined.

Here, rather than a conventionally used halogen lamp or xenon lamp, the LED chip groups 64 are employed as the light sources 66 for the linear CCD scanner 14 of the present embodiment. In each of the two LED chip groups 64, a plurality of LED chips are densely arrayed substantially in a straight line along the photographic film 21 transverse direction. Each of the LED chip groups 64 is disposed such that it faces a respective reading line of the three-line CCD 30.

Figure 4:
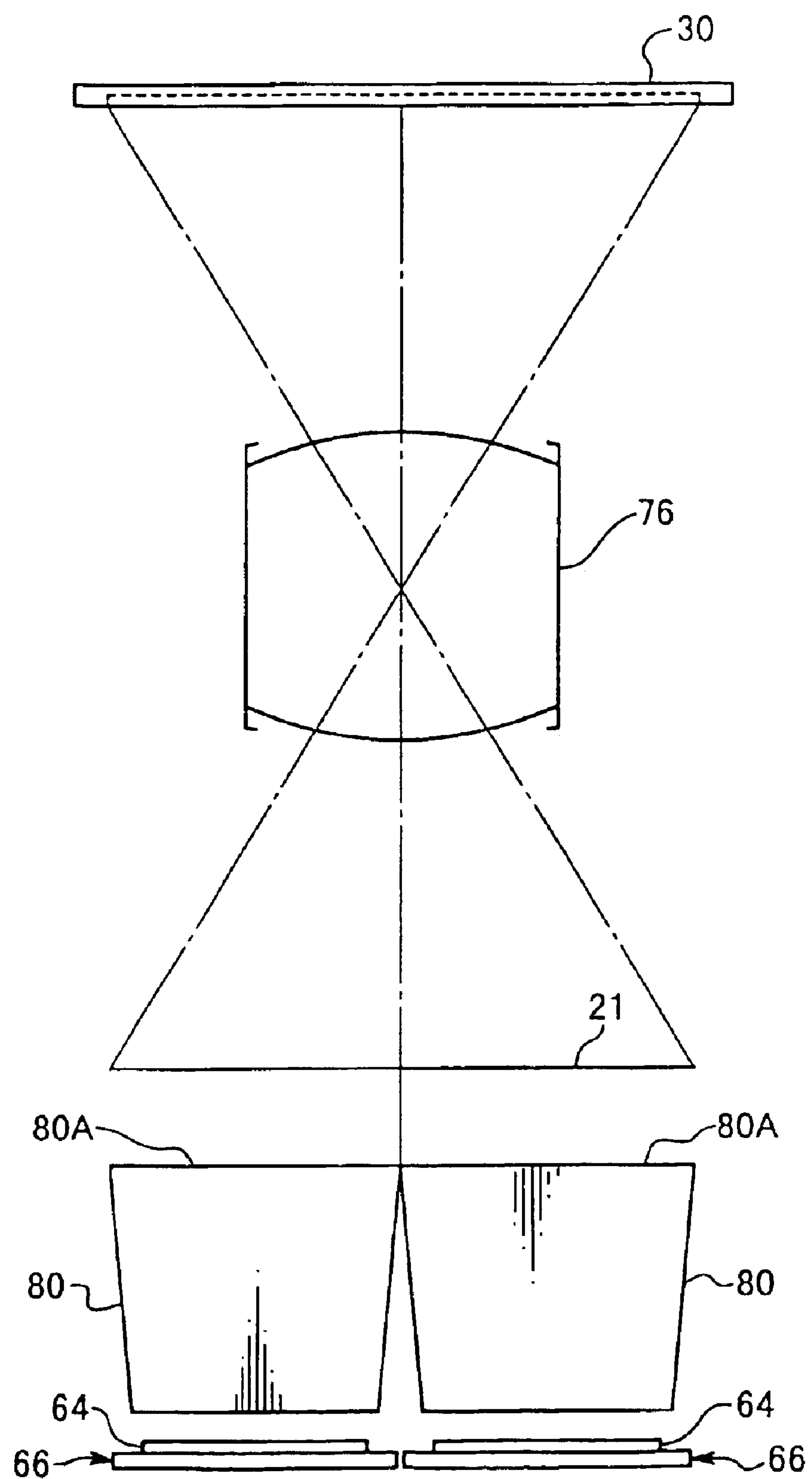
FIG. 4 is a plan view which shows the optical system of the linear CCD scanner shown in FIG. 3.

During the pre-scanning and the fine scanning, each of divergent (diffused) lights emitted from the LED chip groups 64 is guided toward the photographic film 21 by a respective acrylic block 80. The lights irradiate the photographic film 21 as a single light from a single emission surface, which is formed by the two emission surfaces 80A. Light transmitted through the photographic film is focused at almost all the pixels of the three-line CCD 30 by the lens unit 76, as shown in FIG. 4. Thus, image reading is carried out.

Simultaneous Reading of Images of Two 135-Size Films

In a case in which two 135-size films are to be read at the same time, the images are read in the following manner: the operator inserts the two photographic films 22 in the film carrier 74 (see FIG. 5) and selects a mode of simultaneous reading of frame images of two 135-size films, and initialization is carried out. Then, when the operator instructs commencement of reading, the film carrier 74 starts conveying the two photographic films 22, and pre-scanning and fine scanning are carried out in the same manner as described above for the Brownie-size film.

In this case, the two photographic films 22 are simultaneously read by focusing frame images of each of the films at respective predetermined regions of the three-line CCD 30 (See FIG. 6) by means of lights irradiated from the respective LED chip groups 64. Light emission and amounts of light emitted from the LED chip groups 64 are separately controlled according to appropriate conditions.

Image Reading of a Single 135-Size Film

Image reading of only one 135-size film can also be conducted. In this case, the photographic film 22 is inserted in one of the conveyance paths of the film carrier 74. Reading of frame images of one 135-size film is instructed. Thus, only the LED chip group 64 corresponding to the inserted photographic film 22 emits light, and the frame images are read with this irradiated light. Hence, in accordance with film size and number of films to be read, only one LED chip group 64 is selected to emit light and another is put in a stopped state. Thus, an amount of waste light emitted from the light source is reduced.

Determination of which conveyance path to be read or the initialization and the like can be conducted by various kinds of automatic discrimination, as well as by manual input.

Reading Images of a 135-Size Film at High Magnification

The case in which images of a 135-size film are read at high magnification will be described below. The operator inserts the photographic film 22 in the film carrier 74 at the transverse central portion conveyance path thereof (see FIG. 7), and selects a mode for high magnification reading mode of the 135-size film at the keyboard 16K. The LED chip group 64 and acrylic block 80 are moved (if necessary, two LED chip groups 64 and two acrylic blocks 80 are moved) such that one LED chip group 64 and acrylic block 80 correspond to the transverse central portion of the film carrier 74 conveyance path. At the same time, the lens unit 76 moves toward a position at a predetermined distance from the photographic film 22 (moves toward the photographic film 22) and the focusing system is set for high magnification reading (a focusing system of high magnification and large F number).

Next, after commencement of reading has been instructed, only the LED chip group 64 that is at the position corresponding to the transverse central portion of the film carrier 74 conveyance path emits light, and pre-scanning and fine scanning of the photographic film 22 are carried out in the same manner as described above for image reading of the Brownie-size film and the 135-size film.

In the image reading of this case, the frame image (transmitted light) is enlarged by a predetermined magnification by the lens unit 76 and is focused onto a wide light-receiving region (width) which has sufficient region (width) for high magnification reading by the three-line CCD 30. The image data of the frame image therefore has high resolution. The image data is inputted into the image processing section 16, subjected to various kinds of image processing, and can then be outputted as a print which has been enlarged to 12×10 inch size and the like.

Thus, in the linear CCD scanner 14 relating to the present embodiment, high-speed processing of image reading can be achieved by simultaneously reading frame images of a plurality of originals (two 135-size films in the present embodiment).

Moreover, because the light source is formed by two LED chip groups 64 combined, image reading of originals of different sizes (135-size film and Brownie-size film in the present embodiment) can easily be achieved. Furthermore, the light emission controlling structure enables separate control of light emission and amounts of light from each LED chip group 64, in accordance with film size and density of each frame image of each film during simultaneous reading of the two films. Thus, less light emitted from the light source is wasted and efficiency can be improved.

Moreover, reading of a 135-size film at high magnification can be achieved by one of the two LED chip groups 64 moving to the position corresponding to the transverse central portion of the film carrier 74 conveyance path and emitting light after the 135-size film has been inserted in the transverse central portion of the film carrier 74 conveyance path. Thus, the frame image can be read at an image-receiving region (a corresponding number of pixels) sufficient for the three-line CCD 30 to guarantee resolution of a high magnification print.

Further, in this case, because amounts of light emitted from the light source can be controlled in accordance with the size of the original, the light source can be used efficiently.

The present embodiment has been described as having a configuration in which two LED chip groups 64 are linearly disposed. It should be noted, however, that number of LED chip groups and the like are not limited to the above. The light source could also be constructed with the LED chip groups having different widths, according to the variety of sizes of originals from which images are to be read, and by combining two or more LED chip groups.

The present embodiment is applied to transmissive films such as the photographic films 21 and 22, but the present invention could also be applied to reading of reflective originals.

With an image reading device of the present invention having the above-described configuration, high-speed processing can be realized by reading images of a plurality of originals simultaneously. Moreover, with respect to image reading of originals of different sizes, appropriate amounts of light can be obtained from the light source in accordance with the size of each original.

Further, in the present embodiment, light emitting diode is used as light emitting element. However, any kinds of light emitting elements can be applied to the present invention.

What is claimed is:

1. An image reading device for reading an image while conveying an original on which the image is recorded, comprising:

a plurality of light emitting element units, at each of which a plurality of light emitting elements are arrayed along a first direction which is a direction perpendicular to the original's conveyance direction, said plurality of light emitting element units being linearly disposed along the first direction;

an optical member for irradiating light emitted from said plurality of light emitting element units across at least a substantially entire width of the original in the first direction; and photoelectric conversion elements which are disposed in correspondence with said plurality of light emitting element units, receive light that is one of transmitted through and reflected from the image, and conduct photoelectric conversion of the received light, wherein the image is read while at least one original is conveyed, the original having a width dimension corresponding to a width dimension of one of said plurality of light emitting element units or a combined width dimension of at least two of said plurality of light emitting element units;

wherein at least one light emitting element unit for emitting light is selected among said plurality of light emitting element units in accordance with at least one of a first direction dimension of the original, a number of originals and a magnification at which the original is to be read.

2. An image reading device according to claim 1, wherein said optical member is formed by a plurality of light-guiding members which are provided at positions respectively corresponding to positions of said plurality of light emitting element units, and said optical member guides the emitted light to a vicinity of the original and causes the emitted light to be continuous across at least the substantially entire width of the original and to be free of boundary lines.

3. An image reading device according to claim 1, wherein two light emitting element units are provided and the image is read by causing a first direction central portion of one of or both of the light emitting element units to correspond with a first direction central portion of a conveying path of the original, in accordance with a first direction dimension of the original, a number of originals and a magnification at which the original is to be read.

4. An image reading device according to claim 1, wherein said photoelectric conversion elements comprise a three-line charge coupled device (CCD).

5. An image reading device according to claim 1, wherein said optical member comprises an acrylic block having a substantially trapezoid column shape.

6. An image reading device according to claim 1, wherein each of said plurality of light emitting element units comprises a LED chip group.

7. An image reading device according to claim 1, wherein an amount of light output from each of said plurality of light emitting element units is separately controlled.

8. An image reading device according to claim 1, wherein said light emission is respectively separately controlled in accordance with a size of the original and a density of said image.

9. An image reading device for reading an image while conveying an original on which the image is recorded, comprising:

a plurality of light emitting element units, at each of which a plurality of light emitting elements are arranged along a first direction which is a direction perpendicular to the original's conveyance direction, said plurality of light emitting element units being disposed along the first direction;

an optical member for guiding light emitted from each of said plurality of light emitting element units such that the light is irradiated to the original;

an original carrier for positioning the original at a predetermined position and conveying the original; and a light receiving section for receiving light that is one of transmitted through and reflected from the original;

wherein, in accordance with the original which is set at said original carrier, relative positions, in the first direction, of said light receiving section, the original, said optical member and said plurality of light emitting element units can be altered and light emission of each of said plurality of light emitting element units is respectively separately controlled;

wherein at least one light emitting element unit for emitting light is selected among said plurality of light emitting element units in accordance with at least one of a first direction dimension of the original, a number of originals and a magnification at which the original is to be read.

10. An image reading device according to claim 9, wherein said optical member and said plurality of light emitting element units are movable in the first direction, a position of the original at said original carrier, a position of said optical member, and positions of said plurality of light emitting elements are determined in accordance with at least one of a first direction dimension of the original, a number of originals set concurrently at said original carrier, and a magnification at which reading is to be conducted.

11. An image reading device according to claim 9, wherein said optical member is formed by a plurality of light-guiding members which are provided in respective correspondence with said plurality of light emitting element units.

12. An image reading device according to claim 11, wherein each of said plurality of light-guiding members includes a light input section at which light emitted from one of said plurality of light emitting element units enters and a light output section from which the light exits, and end portions in the first direction of the output sections of adjacent light-guiding members contact one another.

13. An image reading device according to claim 9, wherein said photoelectric conversion elements comprise a three-line charge coupled device (CCD).

14. An image reading device according to claim 9, wherein said optical member comprises an acrylic block having a substantially trapezoid column shape.

15. An image reading device according to claim 9, wherein each of said plurality of light emitting element units comprises a LED chip group.

16. An image reading device according to claim 9, wherein an amount of light output from each of said plurality of light emitting element units is separately controlled.

17. An image reading device according to claim 9, wherein said light emission is respectively separately controlled in accordance with a size of the original and a density of said image.

18. An image reading device according to claim 9, wherein each LED chip group includes a linear array of light emitting elements arranged in said first direction mounted to a separate substrate from another LED chip group, the LED chip groups being arranged linearly in said first direction.

19. An image reading device for reading an image while conveying one or more originals on which the image is recorded, comprising:

a plurality of light emitting element units, at each of which a plurality of light emitting elements are arrayed along a first direction which is a direction perpendicular to the originals' conveyance direction, said plurality of light emitting element units being linearly disposed along the first direction;

an optical member for irradiating light emitted from said plurality of light emitting element units across at least a substantially entire width of the originals in the first direction; and photoelectric conversion elements which are disposed in correspondence with said plurality of light emitting element units, receive light that is one of transmitted through and reflected from the image, and conduct photoelectric conversion of the received light;

wherein at least one light emitting element unit for emitting light is selected among said plurality of light emitting element units in accordance with at least one of a first direction dimension of the originals, a number of the originals and a magnification at which the originals are to be read.

20. An image reading device according to claim 19, wherein light emission of said plurality of light emitting element units is respectively selectively controlled in accordance with the number of conveyed originals which are conveyed in parallel.

21. An image reading device according to claim 19, wherein light emission of said plurality of light emitting element units is respectively selectively controlled in accordance with the first direction dimension of the conveyed originals.

22. An image reading device according to claim 19, wherein said optical member is formed by a plurality of light-guiding members which are provided at positions respectively corresponding to positions of said plurality of light emitting element units, and said optical member guides the emitted light to a vicinity of the originals and causes the emitted light to be continuous across at least the substantially entire width of the originals and to be free of boundary lines.

23. An image reading device according to claim 19, wherein two light emitting element units are provided and the image is read by causing a first direction central portion of one of or both of the light emitting element units to correspond with a first direction central portion of a conveying path of the originals, in accordance with a first direction dimension of the originals, the number of originals and a magnification at which the originals are to be read.

24. An image reading device according to claim 19, wherein light emission of said plurality of light emitting element units is respectively selectively controlled in accordance with the first direction dimension and the number of originals which are conveyed.

25. An image reading device according to claim 19, wherein said photoelectric conversion elements comprise a three-line charge coupled device (CCD).

26. An image reading device according to claim 19, wherein said optical member comprises an acrylic block having a substantially trapezoid column shape.

27. An image reading device according to claim 19, wherein each of said plurality of light emitting element units comprises a LED chip group.

28. An image reading device according to claim 19, wherein an amount of light output from each of said plurality of light emitting element units is separately controlled.

29. An image reading device according to claim 19, wherein said light emission is respectively separately controlled in accordance with a size of the originals and density of said image.

* * * * *